US012752454B2

(12) United States Patent
Torriani et al.

(10) Patent No.: US 12,752,454 B2
(45) Date of Patent: Oct. 6, 2026

(54) WOOD SHAPING METHOD

(71) Applicant: Creaholic SA, Biel/Bienne (CH)

(72) Inventors: Laurent Torriani, Lamboing (CH); Carole Chapelat, Biel/Bienne (CH)

(73) Assignee: Creaholic SA, Biel/Bienne (CH)

( * ) Notice: Subject to any disclaimer, the term of this patent is extended or adjusted under 35 U.S.C. 154(b) by 251 days.

(21) Appl. No.: 18/694,951

(22) PCT Filed: Sep. 23, 2022

(86) PCT No.: PCT/IB2022/059014
§ 371 (c)(1),
(2) Date: Mar. 22, 2024

(87) PCT Pub. No.: WO2023/047347
PCT Pub. Date: Mar. 30, 2023

(65) Prior Publication Data

US 2025/0114962 A1 Apr. 10, 2025

(30) Foreign Application Priority Data

Sep. 24, 2021 (CH) ................................ 70308/2021

(51) Int. Cl.
*B27D 1/08* (2006.01)
*B27M 1/02* (2006.01)
*B30B 15/02* (2006.01)

(52) U.S. Cl.
CPC .................................. *B27D 1/083* (2013.01)

(58) Field of Classification Search
CPC ........... B27D 1/083; B27M 1/02; B30B 15/02
See application file for complete search history.

(56) References Cited

U.S. PATENT DOCUMENTS 987,368 A * 3/1911 Lee .......................... B27M 1/02 473/118
2,191,069 A 2/1940 Clark et al.
9,873,368 B2 1/2018 de Weerdt
2021/0170625 A1* 6/2021 Miki ........................ B27N 5/00

FOREIGN PATENT DOCUMENTS

CA 2358452 A1 * 5/2001 .............. B27M 1/02
DE 618230 C * 9/1935
DE 636413 C 10/1936
EP 1706248 A1 10/2006

(Continued)

OTHER PUBLICATIONS

English translate (DE618230C), retrieved date Jan. 21, 2026.*
International Search Report and Written Opinion for PCT/IB2022/059014 mailed Feb. 7, 2023, 11 pages.

*Primary Examiner* — Mohammed S. Alawadi
(74) *Attorney, Agent, or Firm* — BLANK ROME LLP

(57) ABSTRACT

The punching flank 303 on the shaping press 30 makes a second angle γ with the grain of the wood fibers. In order to allow a wider variety of shapes to be pressed into the workpiece and facilitate the demolding of the object from the press after pressing, this angle may vary between 0° and 5°. Thus, the profile of the shaping press on its punching flank may be slightly tapered as illustrated in FIG. 6. This second angle γ additionally makes it possible to obtain a higher quality finish on the internal surface of the wood object.

18 Claims, 10 Drawing Sheets

(56) References Cited

FOREIGN PATENT DOCUMENTS

| | | | | | |
|---|---|---|---|---|---|
| GB | 397513 | A | | 8/1933 | |
| GB | 733971 | A | * | 7/1955 | ............. B65H 75/50 |
| JP | 7-314996 | A | | 12/1995 | |
| JP | 2003500215 | A | | 1/2003 | |
| WO | 00/71309 | A1 | | 11/2003 | |
| WO | 2005070632 | A1 | | 8/2005 | |

* cited by examiner

WOOD SHAPING METHOD

RELATED APPLICATIONS

This application is a national phase of PCT/IB2022/059014, filed on Sep. 23, 2022, which claims priority to CH Application No. 070308/2021, filed on Sep. 24, 2021. The contents of these applications are hereby incorporated by reference in their entirety.

TECHNICAL FIELD

The present invention relates to a method for shaping wood, particularly in order to create wood objects using pressure.

PRIOR ART

In general, wood pressing is a known technique for creating wood objects. This technique involves applying a substantial force to the surface of a workpiece made of wood, often placed in a mold, so as to compress the wood in order to impart a predefined shape to it, while at the same time increasing the strength of the object as a result of the densification thereof. This technique also has the advantage of enabling the creation of recessed shapes that cannot be milled, for example polygonal shapes with sharply-defined corners, something which cannot be achieved by milling because of the diameter of the milling head.

In the vast majority of cases, the compression is applied in a cross-grain direction perpendicular to the fibers of the wood, as the pressure required to compress a piece of wood in a cross-grain direction is far lower than that required to compress the same piece of wood in an along-grain direction parallel to the fibers. In other words, moving the fibers closer together by compression requires less energy than compacting a fiber lengthwise.

It has also been suggested for the wood to be compressed in an along-grain direction parallel to the fibers, although such methods are little used as the pressures employed during along-grain compression of the fibers of the wood may be extremely high and impossible to obtain with ordinary presses or on large-sized objects.

EP1706248 describes a wood object such as a housing for an electronic device which is obtained by compressing a previously machined (for example milled) workpiece. In that document, the bottom of the die (or mold) in which the workpiece is placed is highly curved in order to avoid the problems of demolding and of sharpness of definition of the contours of the finished object. The piece requires the prior machining, for example milling, of a cavity, the depth of which will simply be increased through the pressing operation. Only the bottom of the cavity is subjected to the compression; by contrast, the upper surface of the workpiece experiences no deformation under the action of the shaping press. The esthetic appearance of the external and internal edges of the object is determined chiefly by the milling.

BRIEF SUMMARY OF THE INVENTION

One objective of the present invention is to propose a method for shaping a wood object that is free of the limitations of the methods known from the prior art.

Another objective of the invention is to propose a method for shaping a wood object that is ecological and economical.

Another objective of the invention is to propose a method for shaping a wood object that allows particularly clean lateral and frontal faces and sharp corners to be obtained quickly.

Another objective of the invention is to propose a method for shaping a wood object that allows moisture-resistant and impact-resistant flanks to be obtained quickly.

According to the invention, these objectives are attained notably by means of a method for shaping an object made of wood, comprising the steps of:

- obtaining a workpiece by cutting a piece of wood in a cross-grain direction transverse to the fibers of the wood;
- positioning the workpiece using a die;
- pressing the workpiece using a shaping press brought to bear against a free face of the workpiece, while applying pressure in an along-grain direction parallel to the fibers of the wood;

characterized in that the pressure during pressing exceeds $1.5 \times 10^6$ N/m$^2$.

- in that the pressing is performed cold,
- in that the pressing is performed dry,
- and in that the die comprises a positioning flank bearing against the workpiece during pressing and making a first angle not exceeding 5° with the fibers of the wood of the workpiece positioned in the die, and/or in that the shaping press comprises a punching flank bearing against the workpiece during pressing, the punching, flank making a second angle not exceeding 5° with the fibers of the wood of the workpiece positioned in the die.

The pressure during the pressing step preferably exceeds $2 \times 10^6$ N/m$^2$, and preferentially exceeds $5 \times 10^6$ N/m$^2$. The force used to press the fibers in the direction parallel to the grain is of the order of ten to twenty times greater than a compression perpendicular to the grain.

The punching flank slides along the grain of the workpiece during pressing.

The punching flank may slide along the grain of the workpiece during pressing, without contributing to the longitudinal compression of the fibers, or contributing to this compression in only a very limited way if the punching flanks are not parallel to the grain of the fibers.

In one embodiment, the entire punching flank and the positioning flank slide along the grain of the fibers of the workpiece during pressing.

Compression along the grain of the wood confers advantages upon the resulting object.

In particular, the faces, edges and contours of the finished object are particularly sharply defined because they are defined by the fibers of the wood, which are compressed on themselves but maintain their straightness.

In the case of punching and positioning flanks that are parallel to the grain of the wood during pressing, the lateral faces of the object along these flanks are defined by the lateral surface of compressed contiguous fibers, with no end grain (ends of fibers) being visible on these faces.

This results in lateral faces of a high quality, having very low roughness, and notably in lateral faces that are particularly smooth upon leaving the press.

Even an angle less than 5° between, on the one hand, the punching and/or positioning flanks and, on the other hand, the fibers of the wood makes it possible to limit the number of fibers the end of which appears on lateral faces of the object, thus making it possible to obtain faces that are clean and smooth.

These lateral and/or frontal faces defined by fibers that have been compressed in the longitudinal direction along the grain are particularly resistant to moisture and to impact.

The workpiece does not require the prior machining of a concave housing or cavity.

The concave portion or portions of the component may be obtained solely by pressing, without prior machining.

Because of the high pressures used, there is no need to moisten or to heat the wood in order to deform it.

The pressure exceeding $1.5\times10^6$ N/m$^2$, preferably exceeding $2\times10^6$ N/m$^2$, and preferably exceeding $5\times10^6$ N/m$^2$, makes it possible to obtain objects having sharply-defined faces and edges, and even objects having a polygonal cavity or profile.

Tests have demonstrated that a pressure exceeding $1.5\times10^6$ N/m$^2$, allows at least 50% compression of the height (along the grain of the wood) of the workpiece for wood species having a density less than or equal to 0.5 kg/dm$^3$. By way of example, for a wood with a mean density of 0.5 kg/dm$^3$, the height of the workpiece may be compressed by at most 50% without the finished object suffering as a result. For woods of lower density, even greater compression can be applied without damage, for example, for a wood of a density of 0.4 kg/dm$^3$, the maximum height of the workpiece can be compressed by 60% without jeopardizing the integrity of the object.

The shaping press and the die may comprise guide flanks that slide against one another during pressing. The guide flank or flanks advantageously keep the die precisely in position during pressing, to ensure controlled deformation and precision forming. The workpiece is thus immobilized at the time of pressing.

A guide flank belonging to the die may guide the shaping press during pressing, thus contributing to obtaining sharply-defined flanks on the compressed parts.

The pressing step may be performed using a shaping press comprising a first flank perpendicular to the grain of the wood and a second flat flank, the two flat flanks being connected by the punching flank.

The pressing step may comprise a phase of guiding the shaping press, the guide flank of the die guiding the shaping press.

The guide flanks are advantageously parallel to the direction of pressing.

The guide flanks are advantageously parallel to the along-grain direction of the wood fibers.

The wood is thus compressed longitudinally, while pressing laterally against the positioning flank of the die.

A maximum height of the workpiece in the direction along the grain of the wood fibers can be reduced during pressing.

The height of the guide flank of the die may be greater than the maximum height of the workpiece prior to pressing.

The first surface, the second surface and/or a bottom of the die, may be structured.

The minimum resolution of the relief of the structuring may be a very fine resolution, namely comprised between 10 μm and 50 μm, thus allowing very fine structures to be created at the surface of the wood.

The punching flank may comprise a first chamfer notably smoothing the transition between the interior flank and interior bottom of the object produced.

The first chamfer may make with a bottom surface of the die an angle of at most 35°.

The positioning flank belonging to the die may comprise a second chamfer, notably smoothing the transition between the exterior flank and exterior bottom of the object produced.

The second chamfer may make with a bottom surface of the die an angle of at most 55°.

The shaping press may comprise a transverse or longitudinal stepped staircase profile, notably making it possible to approximate curves that are difficult to achieve.

The pitch of the stepped staircase may be very fine, typically comprised between 0.01 mm and 0.2 mm.

The method may comprise a step of extracting the workpiece so as to strip the workpiece from the die and/or from the shaping press after the step of pressing the workpiece.

The workpiece may have a pre-pressing density of less than 0.75 kg/dm$^3$, preferably less than 0.5 kg/dm$^3$.

The wood from which the workpiece is cut may be chestnut, okoume, arolla pine, linden (lime), alder, poplar, balsa, spruce, fir, maple, walnut, ash or beech.

A step of mechanical machining of the workpiece may be introduced prior to the pressing step so as to increase its porosity and reduce its density.

The mechanical machining may comprise a plurality of micro-drillings in the direction along the grain of the wood fibers.

The micro-drillings may be produced using a drill bit or by punching, for example using needles driven simultaneously in a direction parallel to the grain of the wood fibers.

One end of the shaping press in contact with the workpiece may comprise a beveled profile.

According to the invention, these objectives are also achieved by the wood object obtained by the method described hereinabove.

BRIEF DESCRIPTION OF THE FIGURES

Examplary embodiments of the invention are indicated in the description which is illustrated by the attached figures in which.

EMBODIMENT(S) OF THE INVENTION

The present invention relates to a method for shaping a wood object by compressing a workpiece, the compression being performed in a direction parallel to the fibers of the grain of the wood.

Examples of wood objects that can be obtained using the method of the invention include, for example, toys, cutlery handles, decorative objects, tableware, boxes, clock cases, jewelry boxes, containers or packaging for cosmetic products, haberdashery or fashion elements such as buttons, soles for footwear, etc.

The present method is particularly well suited to containers for viscous products such as ointments, creams or even liquids. This is because the densification resulting from the pressing reduces the porosity of the wood, thus giving it sufficient impermeability to be able to contain viscous or liquid products. Thus, the risk of molecules being transferred from the wood to a material in contact therewith or vice versa is low because the transport channels are closed. In addition, wood is a naturally inert material with antibacterial properties, is pleasant to the touch and often possesses an odor that is considered to be pleasant.

Figure 1:
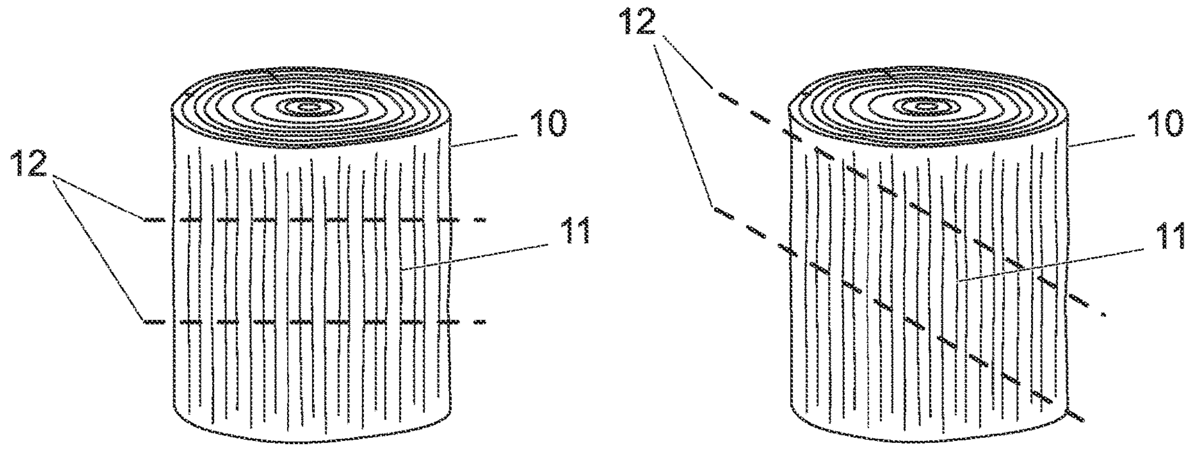
FIG. 1 illustrates possible ways of cutting a workpiece from a block of wood.

FIG. 1 illustrates examples of possible ways of cutting a workpiece 11 from a piece of wood 10. The cutting is performed along cutting lines 12 in a cross-grain direction transverse to the fibers of the wood so as to allow, in a second stage, compression parallel to the fibers of the grain of the wood. The terms cross-grain or transverse here are to be understood as meaning a direction that is "not parallel" to the grain, i.e. that the angle between the cutting lines 12 and the grain of the wood fibers is non-zero.

Figure 2:
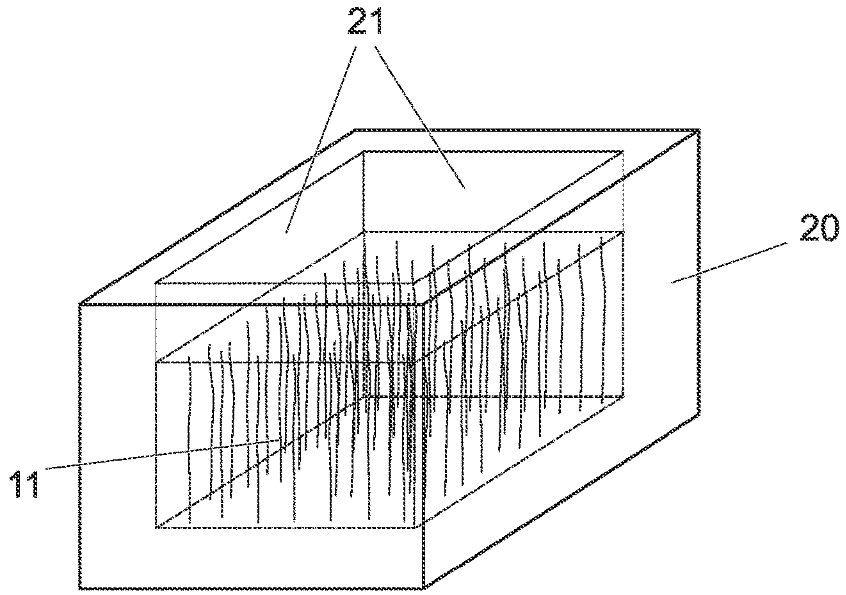
FIG. 2 illustrates a die containing a wood workpiece.
Figure 7:
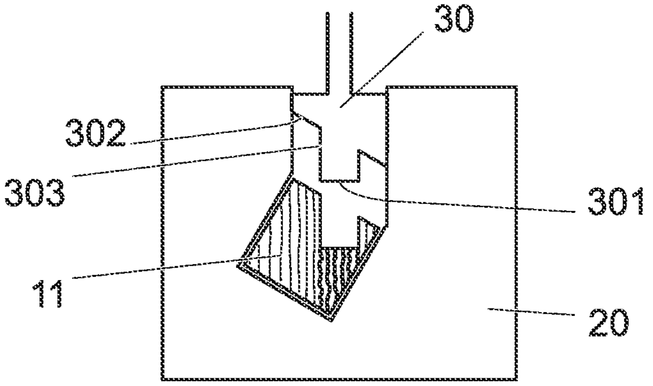
FIG. 7 illustrates a transverse section through a die having a particular housing containing a wood workpiece.

The workpiece 11 obtained by cutting is then positioned in or with a die 20. This die comprises a positioning flank 21 bearing against the workpiece. As illustrated in FIG. 2, the workpiece is positioned inside the die so that one of the faces of the workpiece that runs across the grain of the wood fibers is exposed and so that the positioning flank and the bottom of the die surround the workpiece over the rest of its surface. The positioning of the workpiece may consist in simply placing the workpiece through the open part of the die which is intended to guide the shaping press or, in certain more complex embodiments, the workpiece may be introduced laterally into a housing of the die. Such an embodiment is illustrated in FIG. 7, where the geometric constraints on the workpiece require it to be placed in the die 20, for example by sliding in a direction perpendicular to the direction of pressing. It is also possible for the workpiece to be positioned by means of an opening machined in the workpiece, or by means of die parts that can be clamped together.

Once the workpiece 11 has been positioned against the die 20, this workpiece is pressed by a shaping press 30. The direction of pressing is along the grain parallel to the wood fibers of the workpiece. The shaping press is thus brought to bear against the exposed face of the workpiece and pressure is applied to the press so as to deform the workpiece until such point as all or part of the volume of the shaping press and/or of the die has been reproduced, in negative, in the workpiece.

One feature of the present method is that the pressing is performed cold and dry. Hot pressing makes it possible to reduce the pressing force needed to deform the wood. However, the increase in the temperature of the wood contributes to the drying-out thereof, the consequence of this being greater sensitivity to deformation, notably to shrinkage, which then has to be compensated for, or to cracking. Such compensation can be avoided by steaming the wood prior to pressing, or by means of a die that can be contracted in certain dimensions. However, such steps add further complexity to the method and thus render it more expensive.

Pressing dry also means that the wood workpiece requires no soaking prior to pressing, typically no dipping in a curable resin or no steaming.

The shaping press comprises a punching flank 303 that bears against the workpiece during pressing.

Figure 3A:
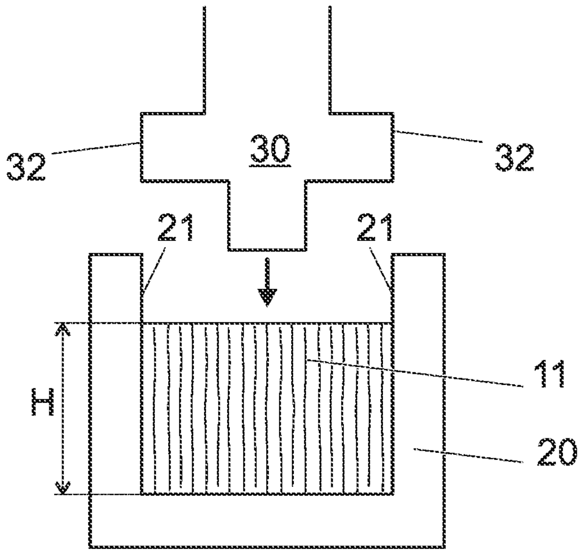
FIG. 3*a* illustrates a pressing step in which a shaping press is brought against a workpiece in a die.
Figure 3B:
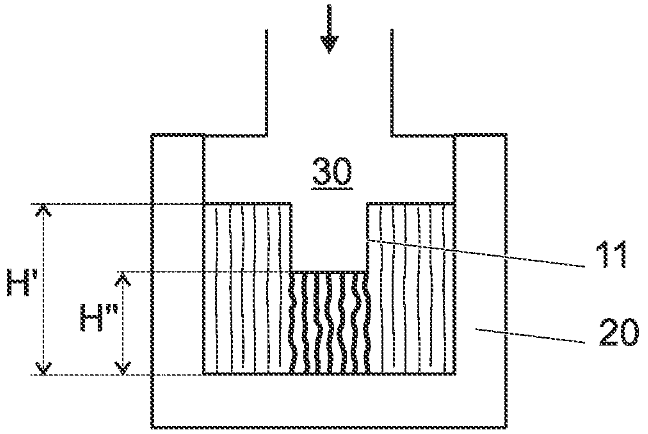
FIG. 3*b* illustrates a pressing step in which the shaping press has compressed part of the workpiece.

FIG. 3*a* illustrates a first step of this method in which the workpiece 11 has been positioned in the die 20 bearing against the positioning flank 21 and a shaping press 30 has been moved toward the exposed surface of the workpiece. FIG. 3*b* illustrates a second step in which a central part of the shaping press 30 has compressed the workpiece 20 until an indentation relative to the lateral part of the workpiece has been obtained.

During the pressing step, the shaping press 30 is brought mechanically against the exposed surface of the workpiece 11. In order to minimize the lateral movement of the shaping press as it moves toward the workpiece, the die may be provided with a first guide flank 24 to guide the shaping press. This first guide flank may, in a preferred embodiment, consist of a portion of the positioning flank 21. In another embodiment which has not been depicted, the guide flank 24 of the die may be a modular element firmly secured to the die so as to increase the surface serving to guide the shaping press. One functionality of this first guide flank 24 is that it guarantees precise guidance of the shaping press relative to the die and to the workpiece during pressing.

As illustrated in FIGS. 3*a* and 3*b*, the shaping press may also comprise a second guide flank 32 that slides against the first guide flank 24 and/or against the positioning flank of the die during movement of the shaping press 30. In order to optimize the guidance of the press, the diameter of the shaping press at the site of the second guide flank is slightly less than the inside diameter of the die at the site of the first guide flank of the die so as to leave a clearance of between 0.01 mm and 0.5 mm which is needed for extracting the object after pressing.

Figure 4:
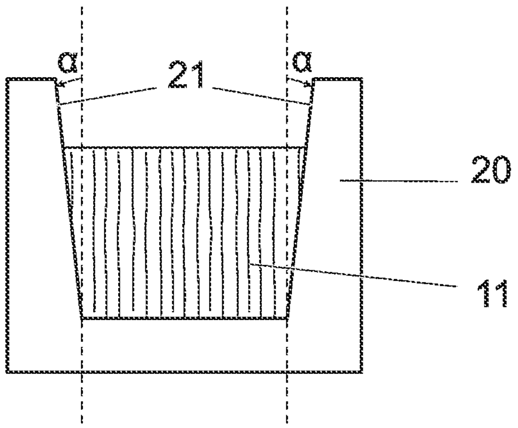
FIG. 4 illustrates a transverse section through a die containing a wood workpiece, the positioning flank of the die being inclined.

To ensure optimal retention of the workpiece 11 during pressing, the positioning flank 21 of the die is ideally parallel to the grain of the wood fibers. However, in order to facilitate the demolding of the wood object after pressing, at least one positioning flank of the die may be slightly inclined by a first angle $\alpha$ relative to the grain of the wood fibers so as to form a truncated cone of which the widest diameter lies toward the exposed face of the workpiece. Such an embodiment is illustrated in FIG. 4. This first angle $\alpha$ may be at most 5° with respect to the direction of pressing, which is to say the direction along the grain of the wood fibers of the workpiece when the latter is positioned in the die.

In one embodiment, the die comprises an inclined positioning flank as described hereinabove so as to facilitate demolding, and a guide flank that is essentially vertical in the continuation of the positioning flank so as to ensure guidance of the press during pressing.

The clearance between the first positioning flank 21 and the workpiece is preferably very small prior to pressing, so as to allow the workpiece to be inserted into the die but ensure that it is immobilized during pressing while avoiding lateral deformation. In one preferential embodiment, this clearance is preferably less than 0.5 mm.

Figure 5:
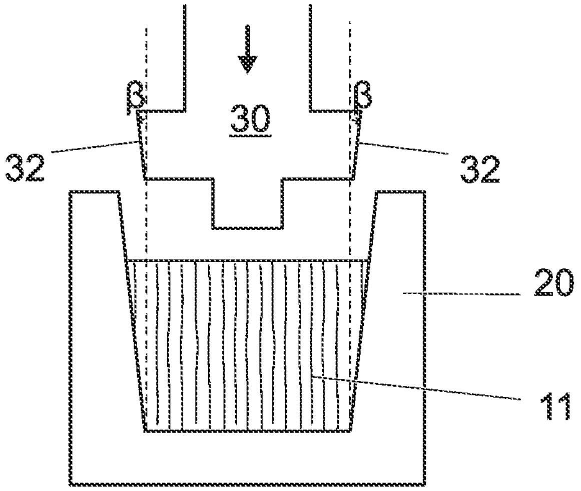
FIG. 5 illustrates a transverse section through a die containing a wood workpiece and through a shaping press, the positioning flank of the die and the guide flank of the press being inclined.

The shaping press 30 illustrated in FIG. 5 comprises a second guide flank 32 which, like the positioning flank 21, is inclined by a third angle β with respect to the direction of compression so as to suit the inclination of the positioning flank. The third angle β may be at most 1° with respect to the direction of pressing. FIG. 5 illustrates an embodiment in which the guide flank 32 of the shaping press forms an angle β so as to correspond to the inclination of the positioning flank 21.

It is possible to have a die or, respectively, a shaping press, with one or more positioning or, respectively guide, flanks which are inclined and at least one other positioning or, respectively, guide, flank that is parallel to the grain of the wood fibers, thus allowing effective guidance of the shaping press against the die throughout the travel of the press.

Inclination of the second guide flank 32 of the shaping press to form an angle β with respect to the grain of the wood fibers makes it possible for example to facilitate the demolding of the workpiece after the pressing step. However, this inclination excludes guidance of the shaping press in the die because as soon as the second guide flank of the shaping press comes into contact with the first guide flank 24 of the die, vertical movement of the shaping press toward the workpiece is prevented.

In another embodiment, the die 20 can be dismantled in order to facilitate the demolding of the wood object after pressing. Alternatively or in addition, the die may be provided with extractors likewise facilitating the demolding of the object.

There are two distinct problems that may arise during demolding. First, the shaping press 30 and the workpiece may remain attached to one another, and second, the die and the workpiece may likewise remain attached to one another.

Figure 13:
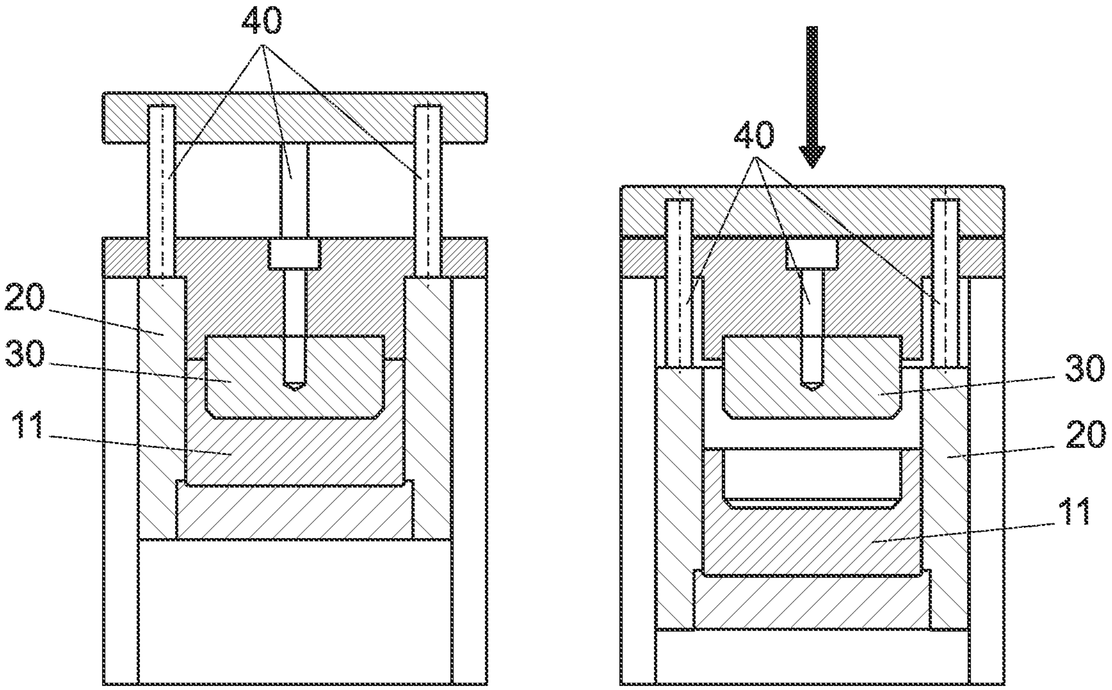
FIG. 13 illustrates two positions of a device for stripping the shaping press after pressing.

In order to detach the shaping press from the workpiece after pressing, a demolding support may be positioned above the die, as illustrated in FIG. 13. The demolding support may comprise rods mobile relative to the die and parallel to the axis of pressing able to press on an upper lateral portion of the die so as to move the die containing the pressed workpiece away from the shaping press mechanically.

In another embodiment, the mobile rods are replaced by a retaining ring able to press on the workpiece as the shaping press is withdrawn so as to extract the shaping press from the workpiece.

Figure 6:
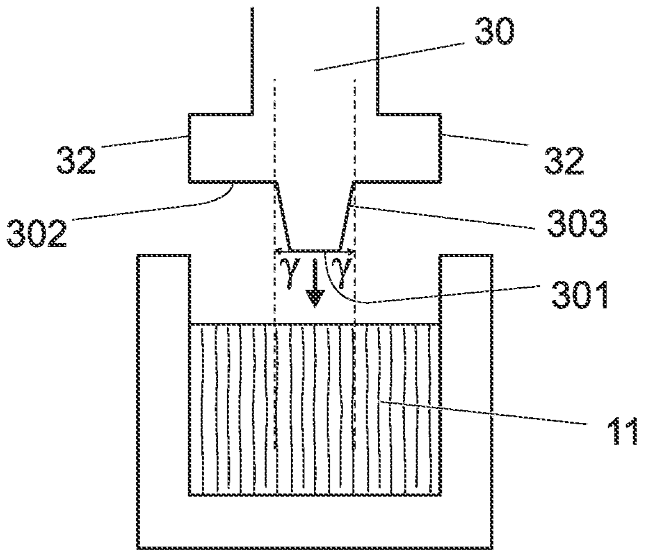
FIG. 6 illustrates a transverse section through a shaping press comprising a punch having an inclined punching flank.

The second punching flank 32 on the shaping press 30 makes a second angle γ with the grain of the wood fibers. In order to allow a wider variety of shapes to be pressed into the workpiece and facilitate the demolding of the object from the press after pressing, this angle may vary between 0° and 5°. Thus, the profile of the shaping press on its punching flank may be slightly tapered as illustrated in FIG. 6. This second angle γ additionally makes it possible to obtain a higher quality finish on the internal surface of the wood object.

Alternatively, extractors may be used to extract or strip the object from the die after pressing. These extractors consist, for example, of modular elements of the die or the shaping press. Typically, if the punching flank of the shaping press is vertical, namely if the angle γ is equal to 0°, it is preferable to add extractors.

In one preferred embodiment illustrated in FIG. 6, the shaping press 30 comprises a first flat surface 301 perpendicular to the grain of the wood fibers when the workpiece 11 is in position in the die 20, and a second flat surface 302, these surfaces being connected by the punching flank 303 of the shaping press. The first flat surface and the punching flank together form a punch that determines the shape and/or the volume for the compression of the workpiece. During the pressing step, the first flat surface 301 is the first part of the shaping press to come into contact with the workpiece and then penetrate same under the effect of the pressure.

Figure 8:
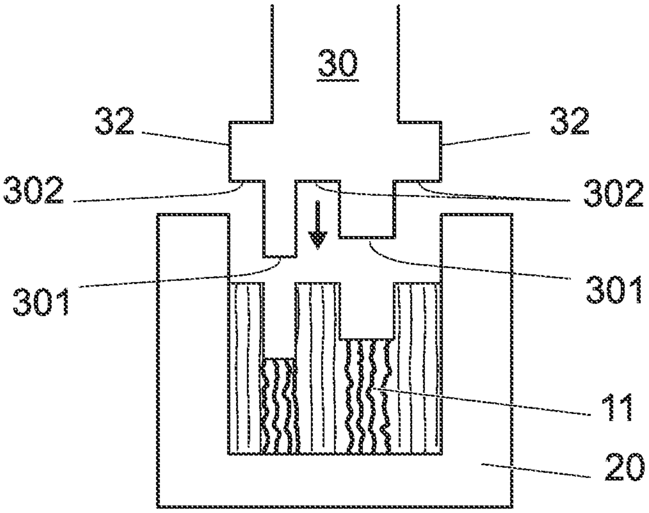
FIG. 8 illustrates a transverse section through a shaping press having a particular profile with two punches.

In another embodiment illustrated in FIG. 8, the shaping press 30 comprises several punches able to create several distinct impressions in the workpiece 11. Each punch comprises a flat 301 first surface perpendicular to the grain of the wood fibers when the workpiece is in position in the die, a second flat surface 302 and a punching flank 303 connecting the first flat surface with the second flat surface.

Figure 15A:
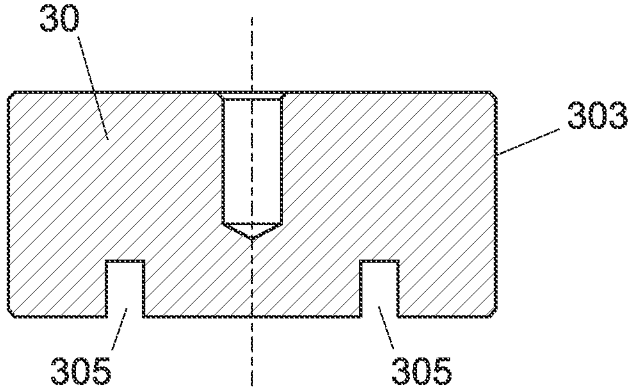
FIGS. 15*a* and 15*b* illustrate shaping presses comprising several punches.
Figure 15B:
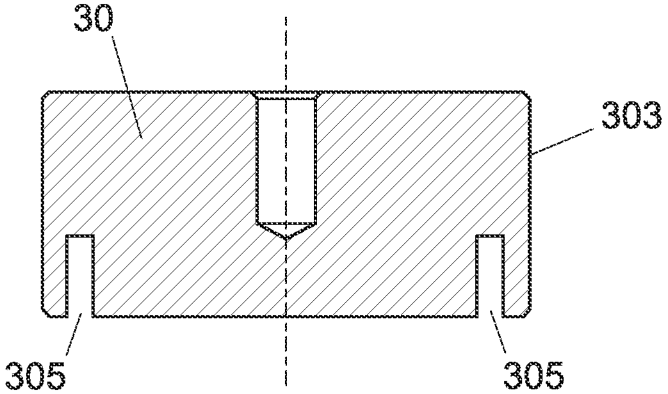

The term punch is used here to refer to the protruding portion(s) of the shaping press at its end closest to the workpiece during pressing. FIGS. 15*a* and 15*b* illustrate shaping presses provided with several punches, for example 3 punches, the width of which may vary. The punches are thus delimited either, laterally, by the punching flank 303 of the shaping press, or by indentations 305 of the shaping press.

The minimum resolution of the wood for pressing with a shaping press comprising several punches, which is to say the minimum distance between the closest ends of two consecutive punches, is comprised between 0.1 mm and 10 mm, preferably between 0.5 mm and 8 mm, typically between 1 mm and 5 mm. This resolution is dependent on a number of parameters, such as the species of wood and/or the depth of pressing. FIG. 15*a* illustrates a shaping press with a resolution of the order of 3 mm, which is to say that the width of the indentations 305 is approximately equal to 3 mm. FIG. 15*b* illustrates an embodiment in which the resolution is approximately 2 mm and in which the indentations are particularly off-centered with respect to the center of the shaping press.

The geometry of the lower portion of the punching flank 303 of the shaping press 30, which is to say the portion that is the first to come into contact with the workpiece during pressing, is particularly important as regards the sharpness of definition of the flanks and of the transition between the bottom and flank of the wood component resulting from the pressing.

In one embodiment, the punching flank forms a sharp angle with the portion of the shaping press that is perpendicular to the grain of the wood fibers.

Figure 11A:
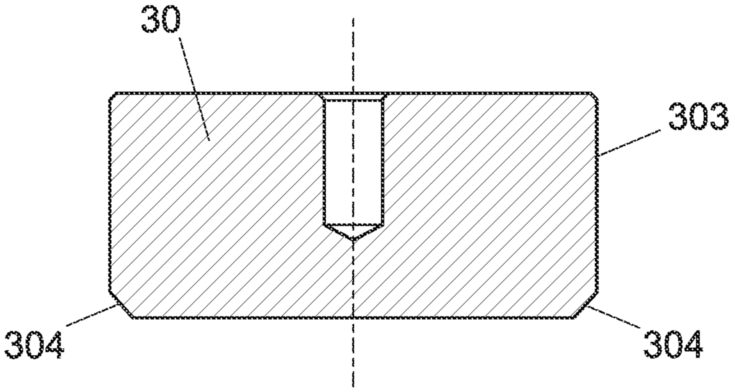
FIGS. 11*a* and 11*b* illustrate chamfered shaping presses.
Figure 11B:
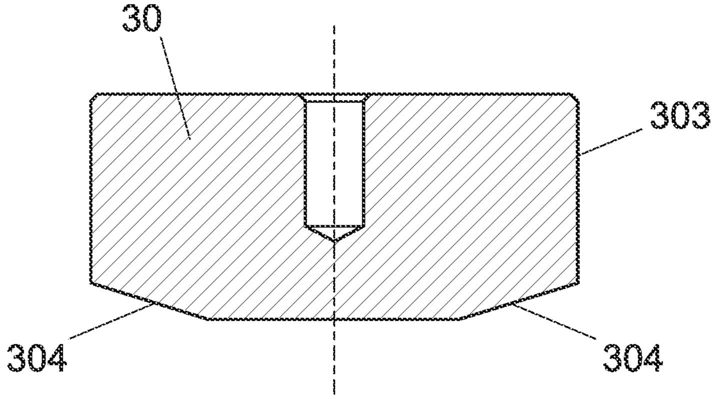

As illustrated in FIGS. 11*a* and 11*b,* the punching flank 303 may also be chamfered with a chamfer 304 so as to obtain a corresponding chamfer on the workpiece after pressing. Such a chamfer is typically used to smooth the transition between the flank and the bottom of the component obtained after pressing the workpiece.

For an interior shape, the transition between the vertical flanks and the bottom surface of the die 23 typically exhibits a sharp angle with a chamfer of at most 35°, preferentially of at most 30°.

Alternatively or in addition, the punching flank 303 may also be radiused such that the angle it makes with the bottom surface of the die does not exceed 35°, preferentially 30°.

In an embodiment which has not been depicted, the guide flank 303 may also be chamfered on an upper portion so as to create a chamfer on an exterior shape of the workpiece during pressing. For such chamfers on external forms, the angle of the chamfer may typically range up to 50°.

Figure 12:
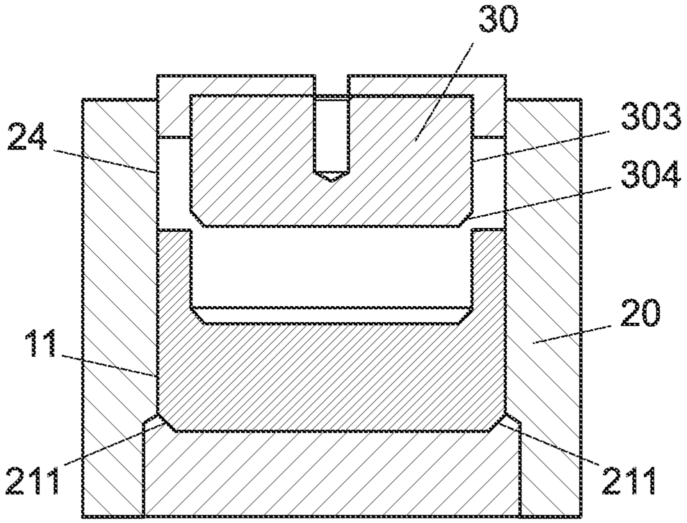
FIG. 12 illustrates a die with a chamfered bottom.

As illustrated in FIG. 12, the positioning flank 21 of the die may also have a chamfer 211 at the transition between the positioning flank and the bottom surface of the die.

Such a chamfer 211 notably facilitates the extraction or stripping of the workpiece from the die after pressing. It also makes it possible to obtain a sharply defined transition between the external flanks of the workpiece and the external surface of the bottom of the workpiece. The chamfer 211 typically makes with a bottom surface of the die an angle of at most 55°, preferentially 45°.

In order to improve the rendering of the part obtained by pressing from the workpiece, the punching flank 303 of the shaping press 30 may comprise a stepped staircase profile the pitch of which is relatively small in comparison with the size of the workpiece. Such a stepped staircase profile notably makes it possible to approximate a curve, which may be complex to achieve by pressing, without impairing the visual rendering. It also makes it possible to improve the sharpness of definition of certain transitions between the flanks and bottom of the workpiece.

Figure 14A:
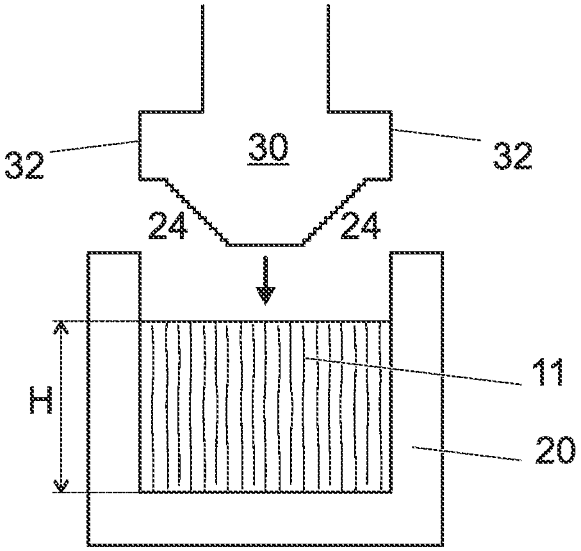
FIG. 14*a* illustrates a shaping press of which one lateral flank comprises a stepped staircase portion.

In an embodiment illustrated in FIG. 14*a*, the profile of the transition between the punching flank and the lower part of the shaping press comprises a stepped staircase of which the pitch, which is to say the depth of a tread of the staircase, is comprised between 0.01 mm and 0.2 mm. The staircase treads are therefore perpendicular to the grain of the wood fibers of the workpiece when it is in the die.

Figure 14B:
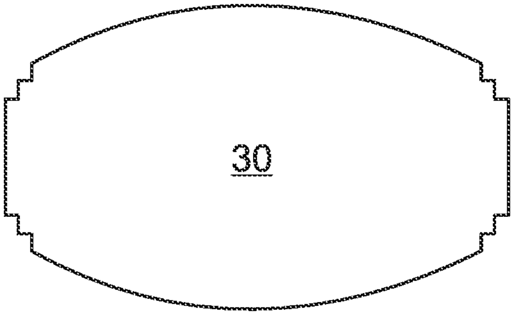
FIG. 14*b* illustrates a view, from beneath, of a shaping press of which the profile comprises stepped staircase portions.

In another embodiment, the guide flank comprises a stepped staircase profile of which the treads are parallel to the grain of the wood fibers of the workpiece. FIG. 14*b* illustrates a stepped staircase profile of the shaping press, which profile is obtained by cutting in a plane orthogonal to the grain of the wood fibers of the workpiece in the die. As explained hereinabove, the pressing of curved portions, notably when their curvature is parallel to the grain of the wood fibers during pressing may be problematic in terms of the sharpness of definition of the flanks when the angle of the curve is great. Approximating such a curve using a stepped staircase portion of which the rectilinear segments are sharply defined when pressed enables this problem to be overcome.

The sharpness of definition of the flanks may be dependent on the speed of pressing. In general, a high pressing speed makes it possible to obtain more sharply defined flanks. This speed is typically comprised between 4 mm/s and 180 mm/s.

During the pressing step, the workpiece 11 may be compressed over the entirety of its exposed surface or over one or a plurality of predefined zones corresponding to the geometry of the shaping press. Thus, the maximum height H of the workpiece in the direction of the grain of the wood fibers may be reduced after pressing if the entirety of the workpiece is compressed. By contrast, the maximum height H of the workpiece in the direction of the grain of the wood fibers may remain identical after pressing if only a zone of the workpiece is compressed.

In FIG. 3*a*, the workpiece has a pre-pressing maximum height H whereas, as illustrated in FIG. 3*b*, the workpiece has a post-pressing maximum height H' and a post-pressing minimum height H". In all instances the following relationships are always satisfied:

$$H \geq H' \geq H''.$$

If only part of the workpiece is pressed, then $H=H'>H''$, whereas if the entirety of the workpiece is pressed, then $H>H' \geq H''$.

The pressing step may be performed by the shaping press 30 exerting a continuous pressure on the exposed surface of the workpiece so as to compress all of the desired height in a single operation. Additionally or alternatively, the pressing step may be performed by applying a hammering action, which is to say a succession of pressings by the shaping press on the exposed surface of the workpiece.

Hammering makes it possible to reduce the pressing force required to press a similar height and/or allows the wood to be densified to a greater depth.

Alternatively or additionally, the workpiece or the die or the shaping press may be subjected to vibrations, for example vibrations in the longitudinal direction along the grain of the wood fibers at a frequency of between 1 Hz and 1 MHz, so as to cause vibration and facilitate the compression of the workpiece by the shaping press. These vibrations make it easier for the shaping press to penetrate the wood, make it easier for the wood fibers to slip against one another, and may play a part in softening the wood by heating it slightly during pressing. Thus, as is the case with hammering, subjecting the workpiece to these vibrations makes it possible to reduce the pressing force required to press a similar height and/or allows the wood to be densified to a greater depth.

The structuring corresponds to the creation of a relief by pressing on a portion of the workpiece, this relief being comparatively small in comparison with the size the workpiece. The reliefs obtained by of structuring typically have a minimum resolution of the order of the size of the water-carrying channels in the wood, namely comprised between 10 μm and 50 μm.

The depth of the structuring relief in the pressing direction is less than the distance that the shaping press travels into the workpiece. The depth of the structures in the direction of pressing may be less than 2 mm.

In one embodiment, the shaping press is structured in such a way as to impress the pattern, in negative, into the workpiece during pressing. Alternatively or in addition, the bottom surface of the die is also structured so as to impress, in negative, the pattern onto the external surface of the workpiece in contact with the bottom of the die.

The structuring makes it possible, amongst other things, to create logos, trademarks, texts, patterns as well as special texturing that may have a physical or esthetic function.

Alternatively or in addition, a structured element may be positioned between the shaping press and the workpiece, or between the workpiece and the bottom surface of the die, so that upon pressing, the pattern of the structured element is reproduced in negative on the workpiece. The structured element may for example be a fabric, a piece of leather, a piece of paper, a leaf from a tree, etc. In one embodiment, a first pressing step shapes the workpiece, notably the flanks, and then a second pressing step allows the structuring of portions of the shaped workpiece.

That part of the shaping press that is in contact with the workpiece during pressing may be structured in such a way as to produce a negative or positive image on the workpiece. The first flat surface and/or the second flat surface of the shaping press may be structured.

Figure 9:
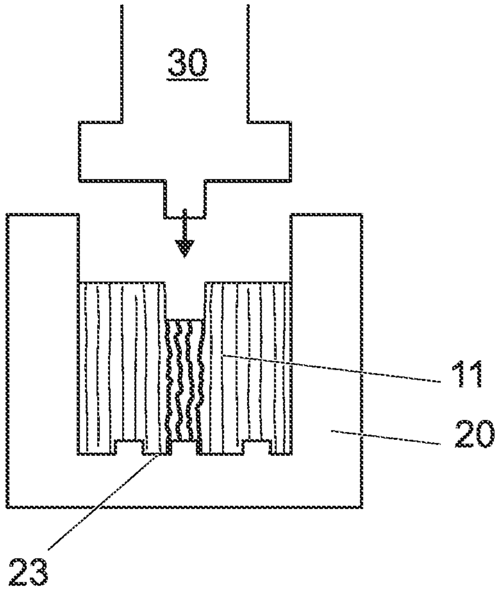
FIG. 9 illustrates a transverse section through a die the bottom of which is structured.

Similarly, FIG. 9 illustrates an embodiment in which the die, in this instance a bottom surface 23 of the die opposite to the exposed surface of the workpiece, may also be structured in order to obtain a positive or negative pattern on the opposite face of the workpiece to its exposed face.

This structuring of the shaping press and/or of the die makes it possible to combine the pressing of a workpiece with a view to shaping a wood object and the negative or positive imprinting of a pattern.

The structures may for example comprise an image, a pattern, a logo, text, ribs, grooves, etc. on the surface of the shaping press so as to be imprinted, in negative, into the workpiece.

Obviously, the species of wood selected for the workpiece has a considerable influence on the pressing parameters and on the variety of objects that can be produced. Specifically, the more dense the wood is, the greater the pressing force that needs to be exerted in order to compress it by a given height. Thus, the lower the density of the chosen wood, the greater the compression can be and therefore the greater the volume compressed.

Thus, in one embodiment, the workpiece is cut from a wood having a density of less than 0.75 $kg/dm^3$, preferably from a wood having a density of less than 0.5 $kg/dm^3$. Suitable species of wood include, for example, poplar or lime/linden (around 0.5 $kg/dm^3$), spruce (around 0.45 $kg/dm^3$), and balsa (around 0.14 $kg/dm^3$) Other species as chestnut, maple, beech, fir, okoume, arolla pine or alder are also particularly well suited to the context of the present invention. This list of species is in no way limiting as the present pressing method works on wood species of densities ranging up to 0.75 $kg/dm^3$, or even up to 0.85 $kg/dm^3$.

In order to increase the porosity of the wood and thus facilitate the pressing step, a preliminary step of mechanically machining the workpiece may be carried out. In one embodiment, a series of micro-drillings is made using a drill bit, or by needle-punching, so as to reduce the density of the workpiece prior to pressing. Because the holes thus pierced by micro-drilling become filled in during the compression, the resulting object may be rendered sufficiently fluidtight that it is able to contain viscous products (creams, pastes, etc.) or even liquid products.

The method of the invention may also be used for manufacturing objects that do not have concave portions on their upper face, but also only convex portions. In one embodiment, the method is used for manufacturing wood toy components, for example stackable building bricks.

In one embodiment, the end of the shaping press that is first to come into contact with the workpiece during pressing has a beveled and/or cutting profile to facilitate its penetration into the wood. Such a profile also makes it possible to obtain clean flanks on the wood object of the pressing and avoid the potential need for post-pressing sanding operations.

Figure 10A:
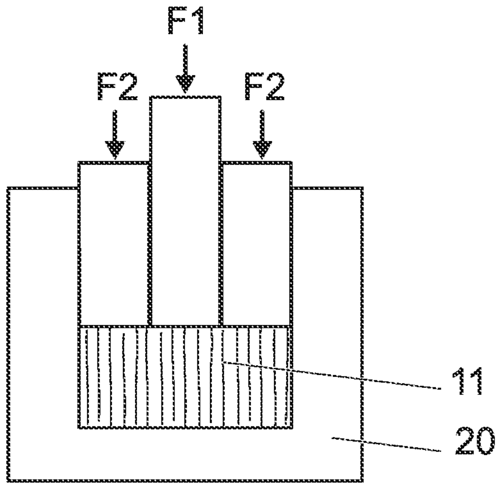
FIG. 10*a* illustrates a transverse section through a shaping press prior to pressing allowing various pressures on the surface of a workpiece.
Figure 10B:
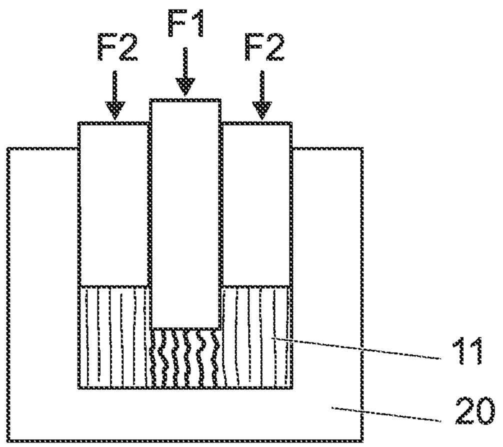
FIG. 10*b* illustrates a transverse section through a shaping press after pressing allowing various pressures on the surface of a workpiece.

In one embodiment illustrated in FIGS. 10*a* and 10*b*, various different pressures may be applied to different zones of the workpiece during a single pressing step using the shaping press. As illustrated in FIGS. 10*a* and 10*b*, a pressing force F2 is applied to a first lateral zone of the workpiece while another pressing force F1 is applied to the central part of the workpiece. In this way, different compression densities and heights can be achieved by means of a single pressing step, while at the same time guaranteeing optimal retention of the workpiece in the die during pressing.

The possibility of obtaining different pressing forces by means of a single shaping press is for example achieved by fitting a spring above the lateral zone of the shaping press (i.e. above the zone corresponding to the pressing force F2). Thus, when the one same pressing force is applied to the top of the shaping press, the spring is able to absorb some of the pressing force in the lateral zone of the workpiece, while the pressure on the central zone is maximal.

The present method may also be applied to the assembling of a second wood workpiece with the first workpiece using pressing. In an embodiment which has not been depicted, a second workpiece is positioned between the first workpiece and the shaping press. The two workpieces are then assembled one with the other during the pressing step under the effect of the pressure exerted by the shaping press. The assembling of the two workpieces may be facilitated by the prior pressing of two corresponding profiles into each of those faces of the workpieces that are intended to come into contact with one another.

Whereas the direction of the grain of the wood fibers of the first workpiece is always parallel to the direction of pressing, the direction of the grain of the wood fibers of the second workpiece may itself be parallel, perpendicular or oblique with respect to the direction of pressing. This latitude allows the creation of interesting patterns on the finished object as well as either facilitating pressing by reducing the pressure needed in order to compress the two workpieces, or else making it possible to obtain a particularly strong finished object. It is also possible to combine wood species of different densities and different compression strengths.

The assembling of two components obtained using the pressing method may also be obtained after the pressing of each component, for example using tenons and/or mortises. The component intended to be inserted in the other one may be dried out before it is inserted; as it regains moisture from the ambient air, it will have a tendency to expand to strengthen the tenon-mortise joint.

Alternatively or in addition, the pressing method of the present invention may also be applied to a workpiece created by bonding two or more pieces of wood together so as to allow the pressing of workpieces of greater size. The bonding may typically be performed in the direction of the grain of the wood fibers of the two pieces. The resistance to pressing of a bonded joint is essentially the same as a non-bonded workpiece. Moreover, the glue lines are practically invisible after pressing.

REFERENCE NUMERALS EMPLOYED IN THE FIGURES

10 Piece of wood
11 Workpiece
12 Cutting line
20 Die
21 Positioning flank
211 Second chamfer
22 Housing
23 Bottom surface of the die
24 First guide flank
30 Shaping press
31 Punch
32 Second guide flank
301 First flat surface
302 Second flat surface
303 Punching flank
304 First chamfer
305 Indentation
40 Mobile rod
$\alpha$ First angle
$\gamma$ Second angle
$\beta$ Third angle
H Pre-pressing maximum height
H' Post-pressing maximum height
H" Post-pressing minimum height

The invention claimed is:

1. A method for shaping an object made of wood, comprising the steps of:

obtaining a workpiece by cutting a piece of wood in a cross-grain direction transverse to fibers of the wood;
positioning the workpiece using a die;
pressing the workpiece using a shaping press brought to bear against a free face of the workpiece, while applying pressure in an along-grain direction parallel to the fibers of the wood;

wherein the pressure during the pressing exceeds $1.5\times10^6$ $N/m^2$,
wherein the pressing is performed cold,
wherein the pressing is performed dry,
and wherein the shaping press comprises a punching flank bearing against the workpiece during the pressing, the punching flank making an angle not exceeding 5° with the fibers of the wood of the workpiece positioned in the die,
a contact surface between the shaping press and the workpiece comprising a first flat surface perpendicular to the fibers of the wood and a second flat surface, the punching flank of the shaping press connecting the first flat surface with the second flat surface so that during the pressing step, the first flat surface is a first part of the shaping press to come into contact with the workpiece and then penetrate the workpiece under an effect of the pressure.

2. The method as claimed in claim 1, wherein during the pressing step, the shaping press is guided by a second guide flank oriented vertically that slides against a first guide flank of the die oriented vertically, the die comprising the first guide flank and the shaping press comprising the second guide flank.

3. The method as claimed in claim 1, wherein the pressing step reduces a maximum height of the workpiece in the along-grain direction.

4. The method as claimed in claim 1, wherein during the pressing step the pressure exceeds $2\times10^6$ $N/m^2$.

5. The method as claimed in claim 1, wherein the pressing step is performed using the punching flank which comprises a first chamfer.

6. The method as claimed in claim 5, wherein the pressing step is performed using the punching flank which comprises a first chamfer, wherein the first chamfer makes an angle of at most 35° with a bottom surface of the die.

7. The method as claimed in claim 1, wherein the pressing step is executed using a stepped staircase profile of the shaping press.

8. The method as claimed in claim 7, wherein the pressing step is executed using the stepped staircase profile of the shaping press which, wherein a pitch of the stepped staircase is comprised between 0.01 mm and 0.2 mm.

9. The method as claimed in claim 1, wherein during the pressing step, a relief on the workpiece is formed using a structure of the shaping press and/or a structure of a bottom surface of the die.

10. The method as claimed in claim 9, wherein during the pressing step the relief is formed so that a minimum resolution of the relief is comprised between 10 μm and 50 μm.

11. The method as claimed in claim 1, wherein the step of obtaining a workpiece is executed so that the workpiece has a density of less than 0.75 $kg/dm^3$.

12. The method as claimed in claim 1, further comprising a step of selecting the piece of wood prior to the step of obtaining the workpiece, among the following species: chestnut, maple, beech, linden (lime), poplar, balsa, fir, okoume, arolla pine, alder, walnut, ash or spruce.

13. The method as claimed in claim 1, further comprising a step of mechanical machining of the workpiece prior to the pressing step so as to increase a porosity of the workpiece and reduce its a density of the workpiece.

14. The method as claimed in claim 13, wherein the step of the mechanical machining comprising executing a plurality of micro-drillings or needle-punchings in the along-grain direction.

15. The method as claimed in claim 1, wherein the pressing step is executed so that one end of the shaping press in contact with the workpiece comprisesing a beveled profile.

16. The method as claimed in claim 1, wherein during the pressing step, the workpiece bears against a positioning flank of the die so that a first angle between the fibers of the wood of the workpiece and the positioning flank does not exceed 5°.

17. The method as claimed in claim 16, wherein during the pressing step, the workpiece bears against a second chamfer of the positioning flank.

18. The method as claimed in claim 17, wherein during the pressing step, the die is configured so that the second chamfer makes an angle of at most 55° with the bottom surface of the die.

* * * * *